Feb. 21, 1961         W. M. SEVERSON         2,972,387
PLANTER AND TOOL LEVELING ARRANGEMENT
Filed Dec. 30, 1958                    2 Sheets-Sheet 1

Inventor
Wilmer M. Severson
By Howard B. Scheckman
Attorney

Feb. 21, 1961 W. M. SEVERSON 2,972,387
PLANTER AND TOOL LEVELING ARRANGEMENT
Filed Dec. 30, 1958 2 Sheets-Sheet 2

Inventor
Wilmer M. Severson
By Howard B. Scheckman
Attorney

United States Patent Office 2,972,387
Patented Feb. 21, 1961

2,972,387

PLANTER AND TOOL LEVELING ARRANGEMENT

Wilmer M. Severson, La Crescent, Minn., assignor to Allis-Chalmers Manufacturing Company, Milwaukee, Wis.

Filed Dec. 30, 1958, Ser. No. 783,966

5 Claims. (Cl. 172—739)

This invention relates to agricultural implements and more particularly to means for positioning a ground engaging tool in a selected position and for rigidly holding said tool in said selected position.

The vertical position of the ground engaging tools of a planter varies relative to the ground level. The vertical position of the tools depends on whether the seed is being planted in a furrow, on level land or on the top of a bed. For best planting results the ground engaging tools of a planter should run level in the ground in each of these planting positions.

In certain types of tractor operated planters however, the ground engaging tools can be set to run level in only one of these planting positions. This is because the draft bar of the planter, which supports the ground engaging tools, is tilted relative to the ground to raise or lower the tools to the correct vertical position. This in turn tilts the ground engaging tools so that they are not level.

This type of a planter presents two problems. The problem of positioning the ground engaging tools in a level position in each of its planting positions, and the problem of holding the ground engaging tools in position against the resistance of the ground.

It is an object of this invention to provide a structure that can be easily operated to correctly position the ground engaging tools in level position for various planting positions.

It is another object of this invention to provide a structure that rigidly holds the ground engaging tools in position against the resistance of the ground.

Other objects and advantages will appear from the following description considered in conjunction with the attached drawings, in which.

*In general*

Essentially the invention comprises providing a block member which cooperates with a slotted member to shift the ground engaging tools to a level position in each planting position.

Figure 1:
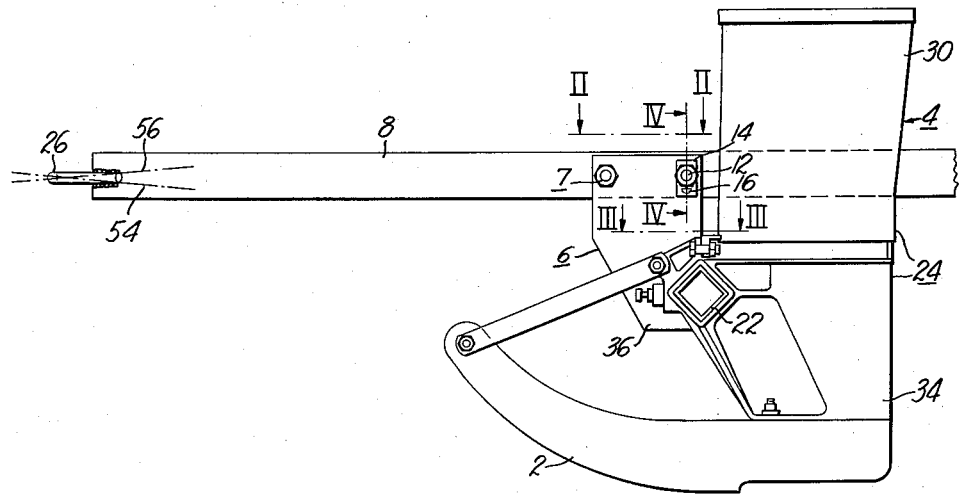
Fig. 1 is a side view of a planter in position for level land planting, or in its neutral position.
Figure 7:
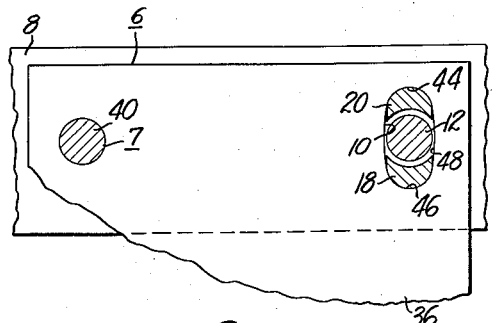
Figs. 7, 8 and 9 are sectional views of Figs. 4, 5 and 6 respectively taken in the direction of arrows VII—VII, VIII—VIII and IX—IX respectively showing the block projection and bolt in the slot in the hanger of the boot frame.

Referring to Fig. 1 the ground engaging tools 2 of planter 4 are supported by hanger 6. Hanger 6 is pivotally connected by pivot means 7 to draft bar 8. Hanger 6 is provided with a slot 10 (Fig. 7), and draft bar 8 is provided with a bolt 12 which cooperates with and supports a block 14 (Fig. 10) in slot 10. Block 14 contains projections 16, 18 and 20.

Block 14 can be selectively positioned in slot 10 to move the hanger member relative to draft bar 8 to position the ground engaging tools in a level position, and to also fill slot 10 so as to hold the ground engaging tools in position.

*Invention specifically*

Referring to Fig. 1 there is disclosed an implement in the form of a planter 4. The planter comprises a draft bar or main frame member 8, boot frame member 22, seed dispensing equipment 24, and ground engaging tools 2.

Draft bar 8 is tubular and supports boot frame 22. A hitch eye 26 is carried at the front of the draft bar for connection to a tractor (not shown).

Boot frame 22 is also tubular and extends transverse to draft bar 8. The boot frame carries a hanger 6 that is pivotally connected to the draft bar by pivot means 7. The boat frame also carries seed hopper 30, seed boot 34 and ground engaging tools in the form of runner openers 2.

Adjusting means in the form of block 14 is provided to position and hold hanger 6 and in turn the runner openers in proper position relative to draft bar 8.

The seed passes from hopper 30 to seed boot 34 and then into the furrow opened by the runner openers 2.

Figure 2:
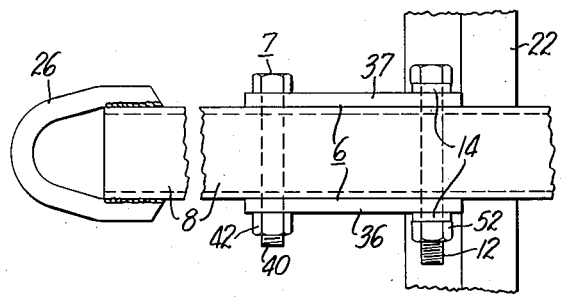
Fig. 2 is a top view of Fig. 1 taken in the direction of arrows II—II showing the hanger of the planter connected to the main frame.
Figure 3:
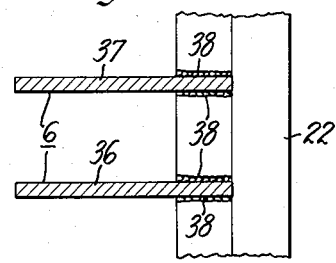
Fig. 3 is a sectional view of Fig. 1 taken in the direction of arrows III—III illustrating the attachment of the hanger to the boot frame.

Hanger 6 which connects boot frame 22 to draft bar 8 comprises two spaced vertical attaching plates 36, 37 that extend transverse to the boot frame. The lower ends of the attaching plates (Fig. 3) are rigidly secured, as by welding 38, to the central portion of the boot frame. The other ends of the attaching plates are pivotally connected (Fig. 2) to the draft bar by pivot means 7 in the form of a bolt 40 and nut 42. The boot frame can be pivoted about the axis of bolt 40 to level runner openers 2 relative to the ground.

The rear portions of attaching plates 36, 37 are provided with aligned openings in the form of vertical slots 10. Slots 10 receive bolt 12 which extends through the main frame. The bolt serves two functions. It acts as an abutment against the slot wall, and it connects attaching plates 36, 37 to main frame 8.

Since attaching plates 36, 37 and blocks 14 carried in each slot in each plate are similar, only one will be described.

Slot 10 in each attaching plate has first and second walls 44, 46 which oppose each other. It is noted that side 48 of the slot is made arcuate. This is to prevent bolt 12 from binding in the slot since hanger 6 moves in an arc about the bolt. The hanger is positioned so that either wall 44, 46 of said slot can engage said bolt.

Bolt 12 carries block 14. The block extends transversely of the bolt. The block cooperates with the bolt to fill slot 10 so as to position and hold hanger 6 in position.

Figure 10:
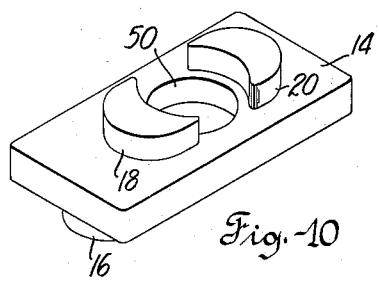
Fig. 10 is a perspective view of the block showing the projections and the opening in the block.
Figure 11:
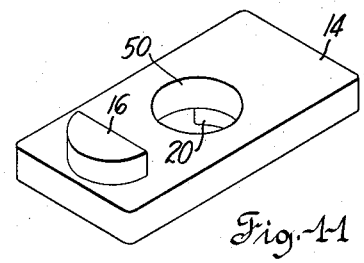
Fig. 11 is a perspective view of the block similar to Fig. 10 but showing the other side of the block.

Referring to Fig. 10, block 14 is generally rectangular in shape. It has a single opening 50 therethrough, and three projections 16, 18 and 20. Projection 16 on one surface and the remaining two projections 18, 20 on the opposite surface. The projections are shaped to conform to slot 10.

Projection 16 is located off center with respect to opening 50. It is spaced from the opening a distance equal to the length of slot 10.

Projections 18 and 20 are spaced equal distances on either side of opening 50. These projections are spaced a distance equal to the length of slot 10.

Projections 16, 18 and 20 extend parallel to bolt 12 when the block is positioned in slot 10.

Clamp means in the form of nut 52 is carried by bolt 12 to releasably clamp block 14 selectively in either of three positions.

Figure 4:
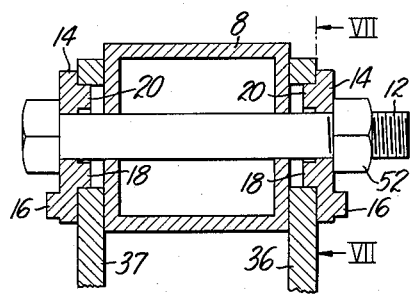
Fig. 4 is a sectional view taken in the direction of arrows IV—IV of Fig. 1 showing the position of the blocks, attaching plates and main frame, when the planter is in the level land planting position.

In the first or level land planting position (Figs. 4 and 7) draft bar 8 is level. Block 14 is mounted so that equally spaced projections 18, 20 are received in slot 10. The projections engage opposing walls 44, 46 of the slot. Bolt 12 is located at a midpoint intermediate said projections. This will position hanger 6 so that it is in a position wherein the runner openers are level for level land planting.

Figure 5:
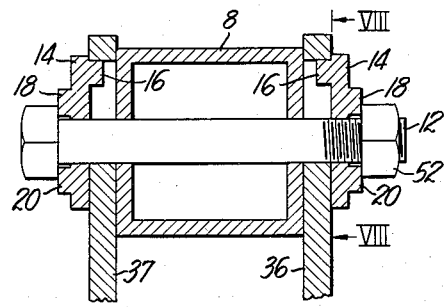
Figs. 5 and 6 are views similar to Fig. 4 showing the position of the blocks, attaching plates and main frame, when the planter is in the furrow and bed planting positions respectively.
Figure 8:
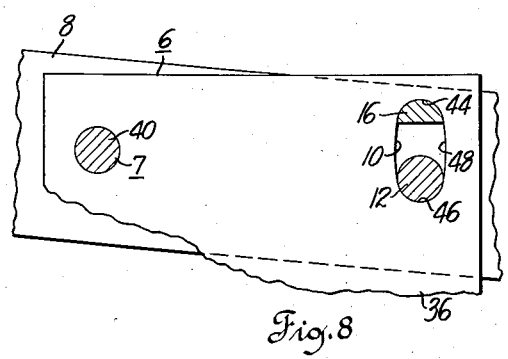

In the second or furrow planting position (Figs. 5 and 8), draft bar 8 is tilted as indicated by dot-dash line 54 in Fig. 1. The adjusting block is turned over and reinserted. In this position single projection 16 is received in slot 10. The projection engages first wall 44 of the slot while the bolt engages second wall 46 of the slot. This will position hanger 6 about the axis of bolt 40 so it is in a position wherein the runner openers are level for furrow planting.

Figure 6:
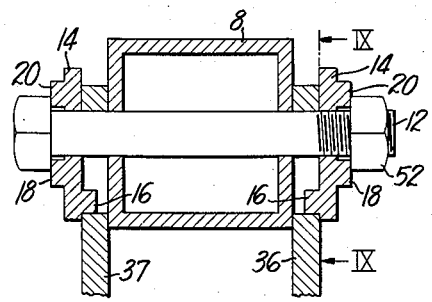
Figure 9:
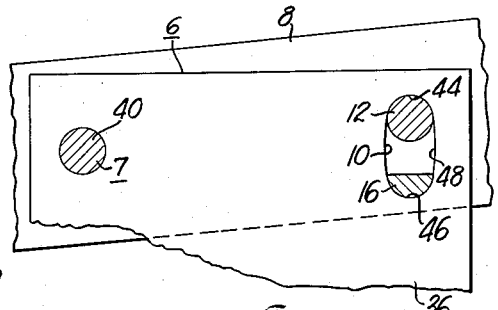

In the third or bed planting position (Figs. 6 and 9), draft bar 8 is tilted as indicated in dot-dash line 56 in Fig. 1. Adjusting block is turned end for end and reinserted. In this position projection 16 engages second wall 46 of the slot and bolt 12 engages first wall 44 of the slot. This gives the same amount of adjustment in the opposite direction. This positions hanger 6 about the axis of bolt 40 so it is in a position wherein the runner openers are level for bed planting.

*Operation*

To adjust the position of the runner openers 2, nut 52 is first loosened. Then the adjusting blocks 14 are positioned to provide the desired angular adjustment. It is then only necessary to pivot boot frame 22 around pivot 7 relative to draft bar 8 until the selected projections on the blocks fit into the slots. Nut 52 is then tightened to lock the parts rigidly in position.

*In summary*

This invention provides a simple positioning and clamping structure that easily levels the ground engaging tools and holds them in position against the resistance of the ground.

When the ground engaging tools are angularly adjusted, the bolt and projection on the blocks cooperate to fill the slot in the hanger element. This rigidly holds the hanger in position. The bolt prevents movement of the hanger in one direction and the projection prevents movement in the reverse direction, or both projections prevent movement. With this type of an arrangement the planter implement cannot be moved out of its adjusted position.

Although two spaced attaching plates welded to a common support (boot frame) and two blocks are illustrated, it is obvious that the invention would apply if a single block were used.

Although but a single embodiment of the present invention has been illustrated and described, it will be apparent to one skilled in the art that various changes and modifications may be made therein without departing from the invention or from the scope of the appended claims.

Having now particularly described and ascertained the nature of my said invention and the manner in which it is to be performed, I declare that what I claim is:

1. In a mounting for a ground engaging tool carried by a frame member, said frame member containing a slot having similar end walls, and wherein said slot receives an abutment, the combination comprising: a block, a projection carried by said block, said projection shaped complementary to and engaging the end wall of said slot, and said block containing an opening for reception of said abutment, the far side of said opening being spaced from said projection the length of said slot.

2. In a farm implement, an arrangement for positioning and clamping a ground engaging tool, comprising: a first frame member; a second overlapping frame member containing a slot having first and second opposing walls, said second frame member carrying said tool, an abutment carried by said first member and extending in said slot in said second member; a block carried by said abutment; said block having a projection to engage one wall of said slot, said abutment being spaced from said projection and engaging the opposing unengaged wall of said slot; and, clamp means carried by said abutment to clamp said block selectively with said projection in either of two positions in said slot to change the position of said frame members relative to each other, in a first position with said projection against said first wall of said slot and said abutment against said second wall of said slot, and in a second position with said projection against said second wall of said slot and said abutment against said first wall of said slot, said block when clamped cooperating with said abutment to lock said frame members in position.

3. In a farm implement an arrangement for selectively positioning and clamping a ground engaging tool, comprising: a first frame member; a second overlapping frame member containing a slot having first and second opposing walls, said second frame member carrying said tool; pivot means pivotally connecting said first and second members for relative pivotal movement; an abutment carried by said first member and extending in the slot of said second member; a block carried by said abutment; a first projection fixed to one surface of said block, said projection being positioned to engage one wall of said slot and hold said abutment against the opposing wall of said slot; second and third projections fixed to the opposite surface of said block, said abutment extending between said second and third projections, said second and third projections being spaced to engage said opposing walls of said slot; and, clamp means carried by said abutment to detachably clamp said block selectively in either of three positions to change the angular position of said frame members relative to each other, in a first position with said first projection against said first wall of said slot and said abutment against said second wall of said slot, or in a second position in which the position of said projection and abutment are reversed, or in a third position with said second and third projections against said opposing walls of said slot, said block when clamped cooperating with said abutment to clamp said frame members in said adjusted angular position.

4. In a planter, the combination comprising: a drawbar adapted for connection to a tractor; a boot frame; ground engaging implements carried by said boot frame; a hanger fixed to said boot frame; pivot means pivotally connecting said hanger to said drawbar; said boot frame extending transversely of said drawbar; said hanger containing a slot having first and second opposing walls; an abutment carried by said drawbar and extending in said slot; said hanger positioned to pivot about said pivot means to move said first or second walls of said slot into engagement with said abutment carried by said drawbar; a block carried by said abutment; said block extending transversely of said abutment; a first projection fixed to one surface of said block, said first projection being spaced from and extending parallel to said abutment, said projection positioned to engage one wall of said slot and hold said abutment against the opposing wall of said slot; a second and third projection fixed to the opposite surface of said block and spaced to engage said opposing walls of said slot; said abutment being spaced between said second and third projections; and, clamp means carried by said abutment to releasably clamp said block selectively, in either a first position with said first projection against said first wall of said slot and said abutment against said second opposing wall of said slot, or in a second position with said first projection against said second opposing wall of said slot and said abutment against said first wall of said slot, or in a third position with said second and third projections against said opposing walls of said slot, to position and clamp said hanger in adjusted angular position relative to said drawbar.

5. In a planter, a combination comprising: a drawbar frame member adapted for connection to a tractor; a boot frame member; ground engaging implements carried by said boot frame; two spaced plates fixed to said boot frame; pivot means pivotally connected said spaced plates on opposite sides of said drawbar; said boot frame extending transversely of said drawbar; said spaced plates containing registering vertical slots having first and second opposing walls; an abutment carried by said drawbar and extending through said slots in said plates; a block carried in each of said slots, said blocks extending transversely to said abutment; a first projection fixed to one surface of each of said blocks, said first projection extending parallel to said abutment, said projections positioned to engage said first wall of their respective slots and hold said abutment against said second opposing wall of their respective slots; second and third projections fixed respectively to the opposite surface of each of said blocks; said abutment extending between said second and third projections, said second and third projections being spaced to engage said opposing walls of their respective slots; and, clamp means carried by said abutment to detachably hold said blocks selectively in either a first position with said first projections against said first walls of said slots and said abutment against said second walls of said slots, in a second position with said first projections against said second walls of said slots and said abutment against said first walls of said slots, and in a third position with said second and third projections against said opposing walls of their slots, said clamp means, blocks, and abutment, cooperating to clamp and hold said frame members in adjusted angular positions as determined by the position of said blocks.

References Cited in the file of this patent
UNITED STATES PATENTS

| | | |
|---|---|---|
| 339,508 | White | Apr. 6, 1886 |
| 1,097,185 | Oehrle | May 19, 1914 |
| 1,110,290 | James | Sept. 8, 1914 |
| 2,332,752 | Ratcliff | Oct. 26, 1943 |
| 2,624,256 | Todd | Jan. 6, 1953 |